(12) United States Patent
Pesetsky

(10) Patent No.: US 8,246,311 B2
(45) Date of Patent: Aug. 21, 2012

(54) WIND TURBINE ROTOR BLADE WITH VARIABLY ACTUATABLE POROUS WINDOW

(75) Inventor: David Samuel Pesetsky, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/961,792

(22) Filed: Dec. 7, 2010

(65) Prior Publication Data

US 2011/0103952 A1    May 5, 2011

(51) Int. Cl.
*B64C 21/04* (2006.01)

(52) U.S. Cl. .................................. 416/231 R; 416/90 R

(58) Field of Classification Search .................... 415/4.3, 415/4.5, 115; 416/41, 90 R, 91, 227 R, 231 R
See application file for complete search history.

(56) References Cited

U.S. PATENT DOCUMENTS

| | | | |
|---|---|---|---|
| 1,501,248 A | 7/1924 | Strong | |
| 3,144,220 A | 8/1964 | Kittelson | |
| 6,984,110 B2 | 1/2006 | Jang | |
| 7,143,983 B2 | 12/2006 | McClure | |
| 7,400,057 B2 | 7/2008 | Sureshan | |
| 7,435,057 B2 | 10/2008 | Parera | |
| 7,520,722 B2 | 4/2009 | Schukin et al. | |
| 7,832,689 B2 | 11/2010 | Prince et al. | |
| 2008/0317598 A1 | 12/2008 | Barbu et al. | |
| 2011/0103950 A1 | 5/2011 | Pesetsky et al. | |

FOREIGN PATENT DOCUMENTS

| | | |
|---|---|---|
| EP | 1736663 | 12/2006 |
| EP | 2053240 | 4/2009 |
| GB | 2186033 | 8/1987 |
| WO | WO 2007/007108 A1 | 1/2007 |

*Primary Examiner* — Ninh H Nguyen
(74) *Attorney, Agent, or Firm* — Dority & Manning, P.A.

(57) ABSTRACT

A wind turbine blade includes a porous window defined in the suction side of the blade. The porous window includes a plurality of holes defined therein. An air manifold within the internal cavity of the blade is in airflow communication with the porous window. An inlet air passage in the pressure side of the blade is in communication with the air manifold. A deployable cover member is configured adjacent the porous window and is variably positionable from a fully closed position wherein airflow through the holes in the porous window is blocked to a fully open position wherein airflow is established through the holes in the porous window.

18 Claims, 8 Drawing Sheets

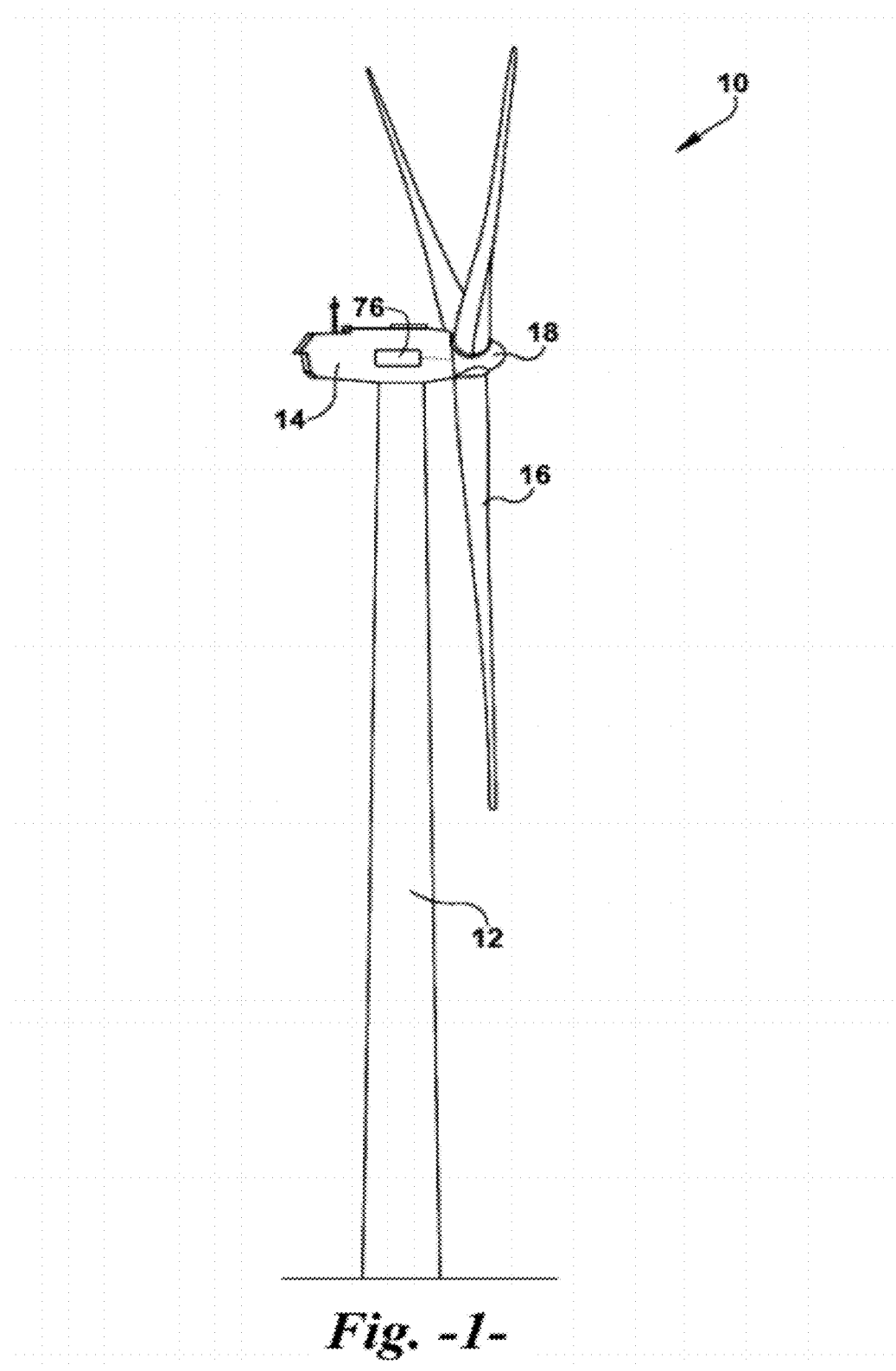
Fig. -1-

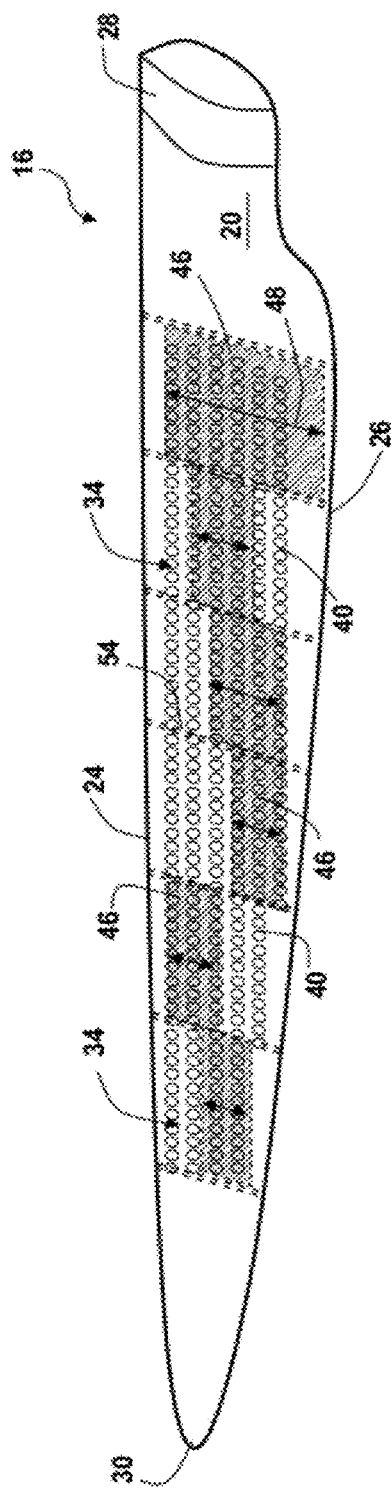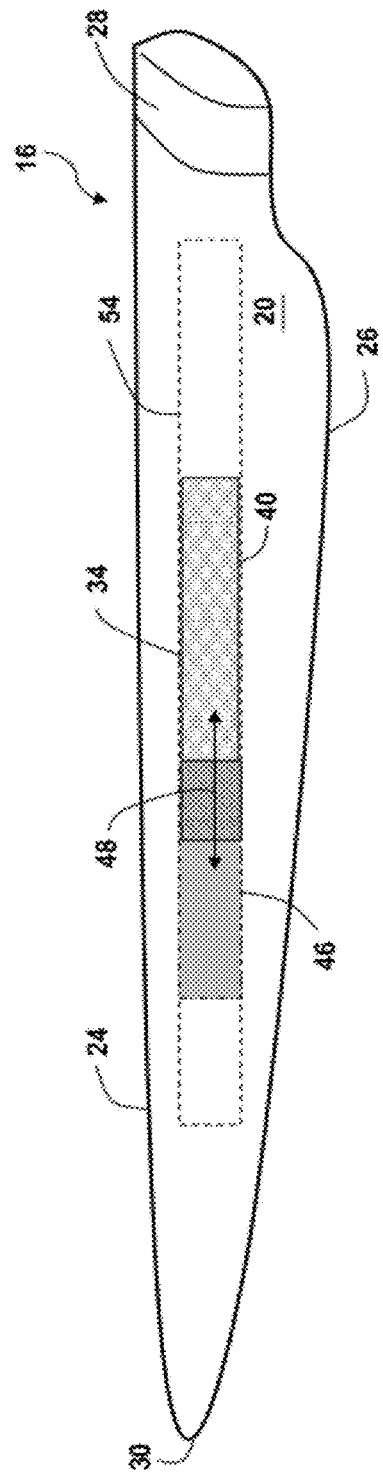

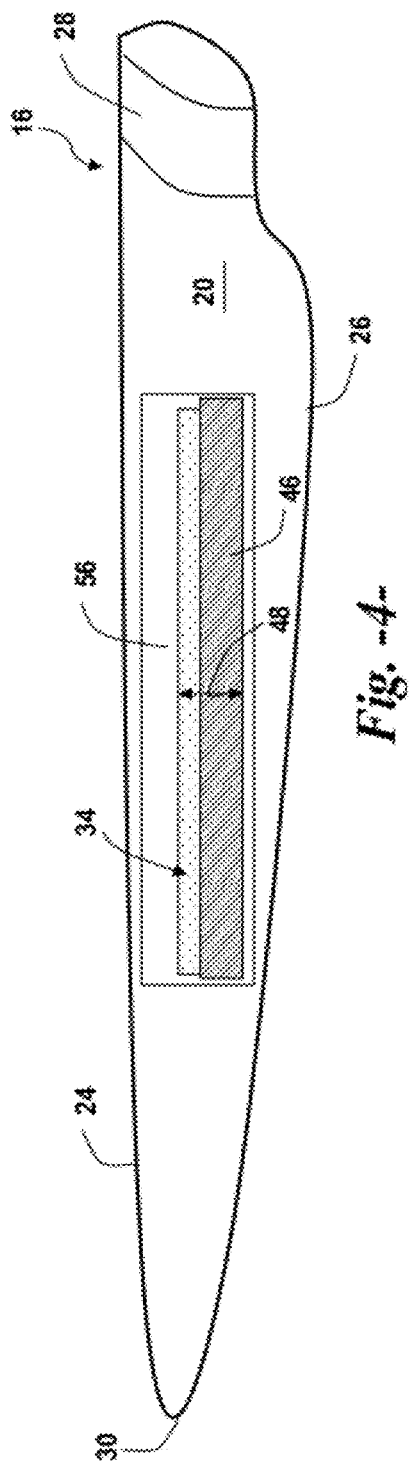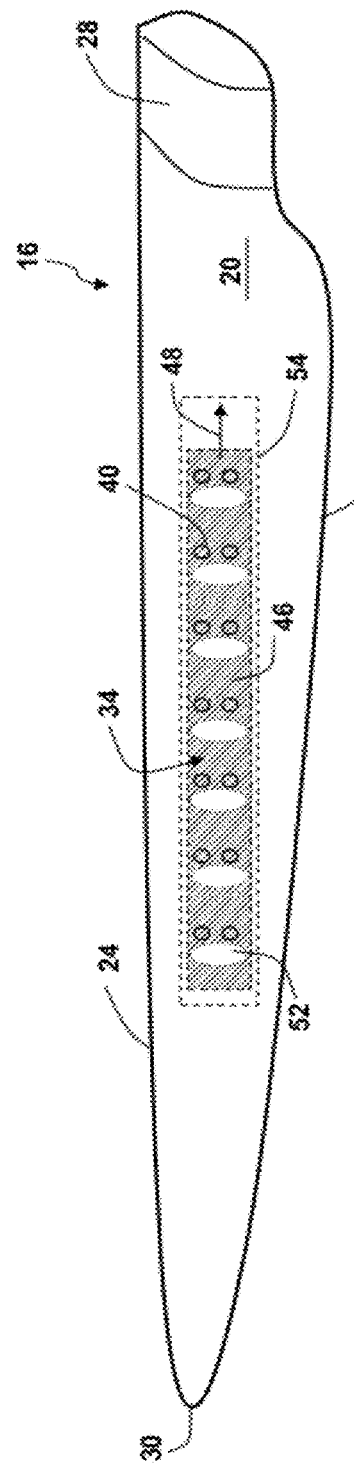

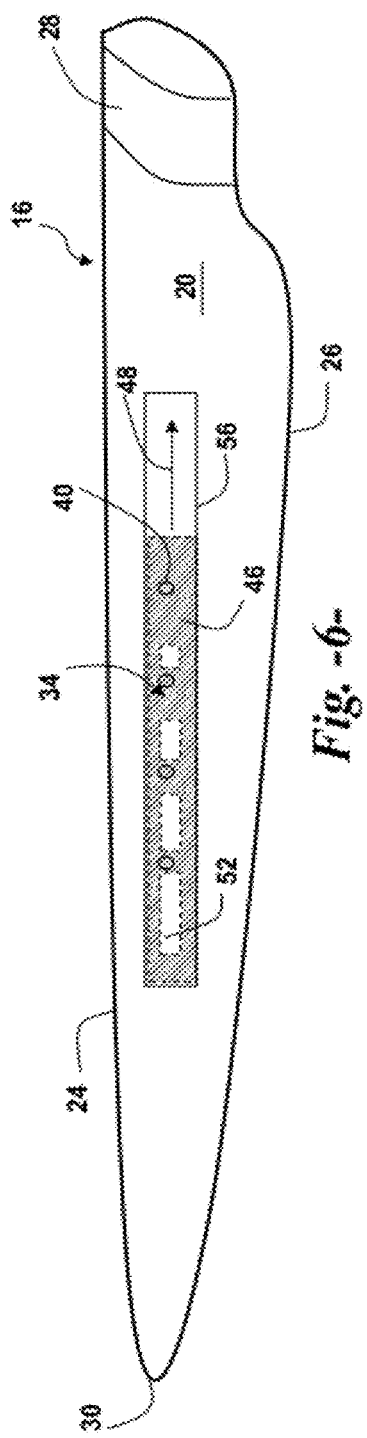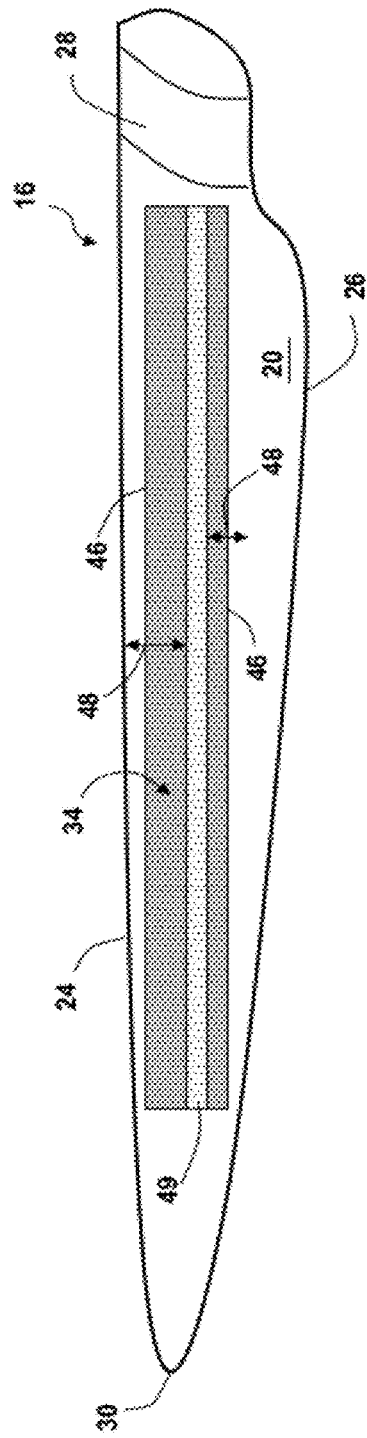

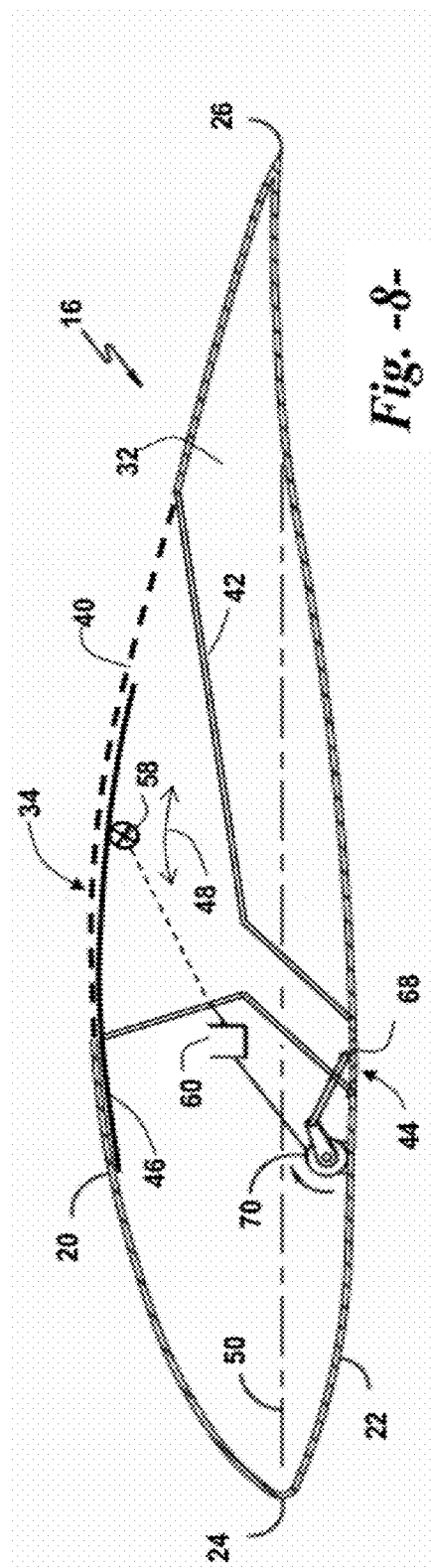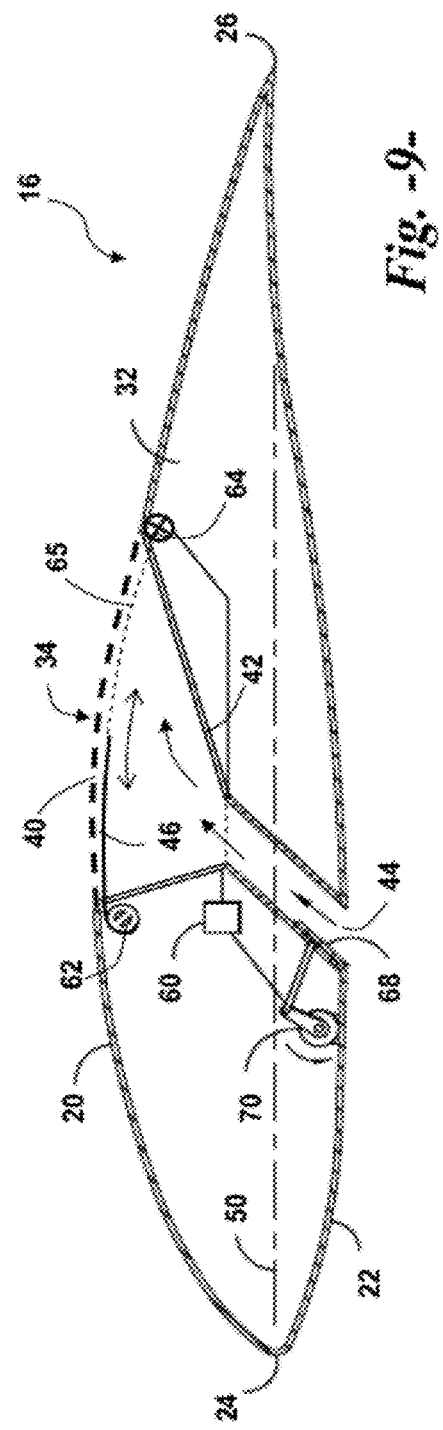

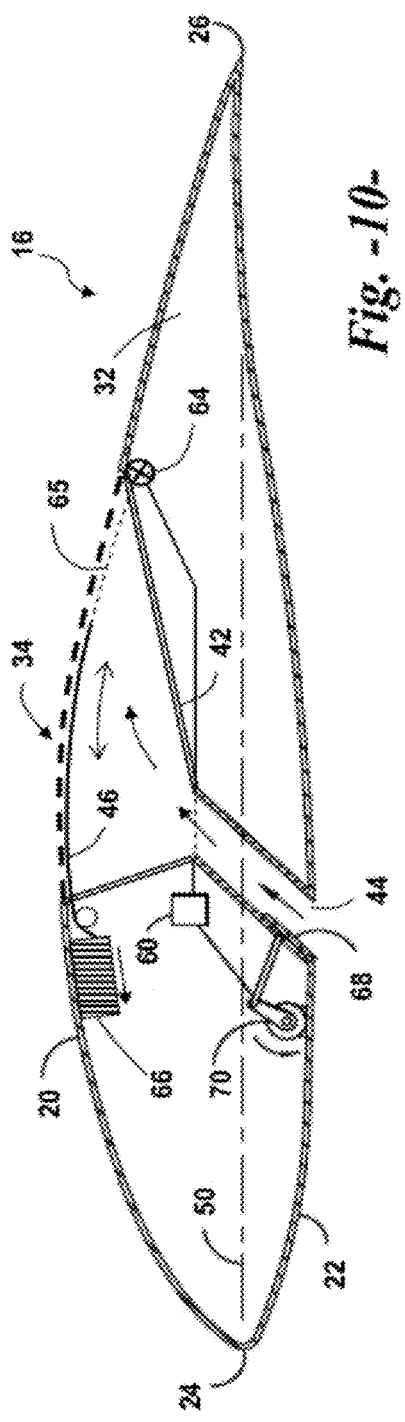
Fig. -10-
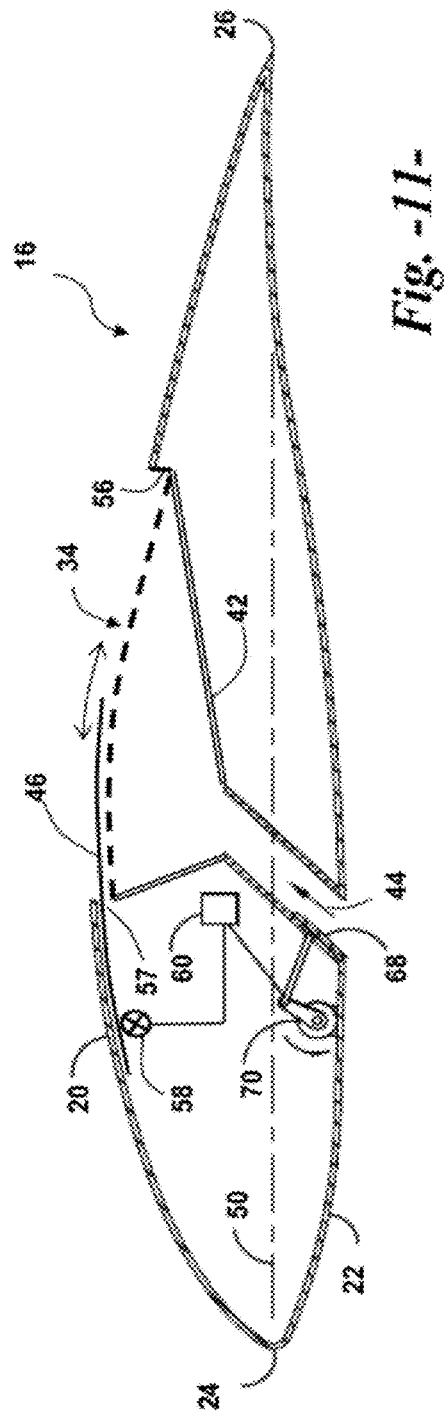
Fig. -11-

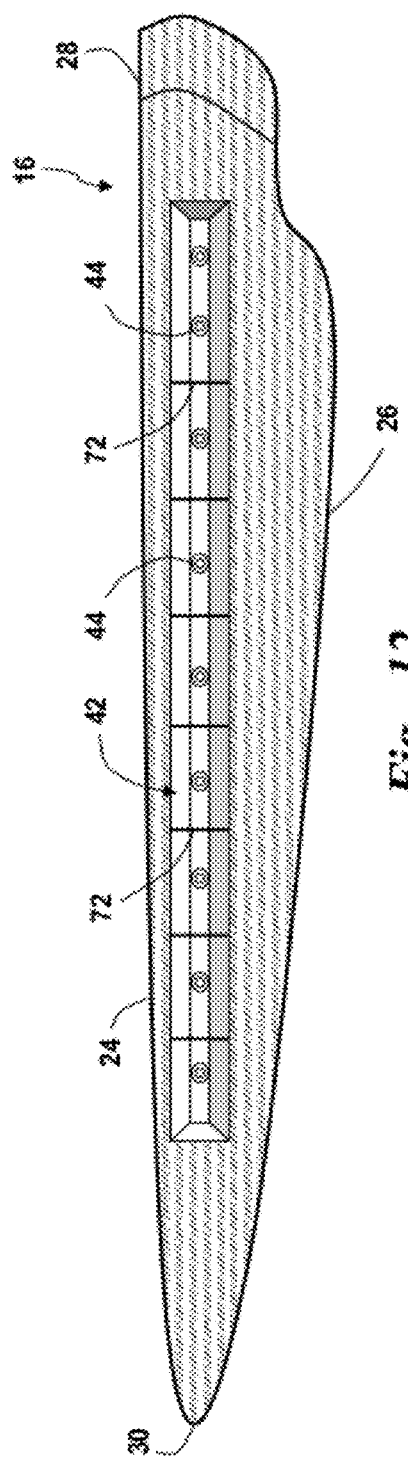

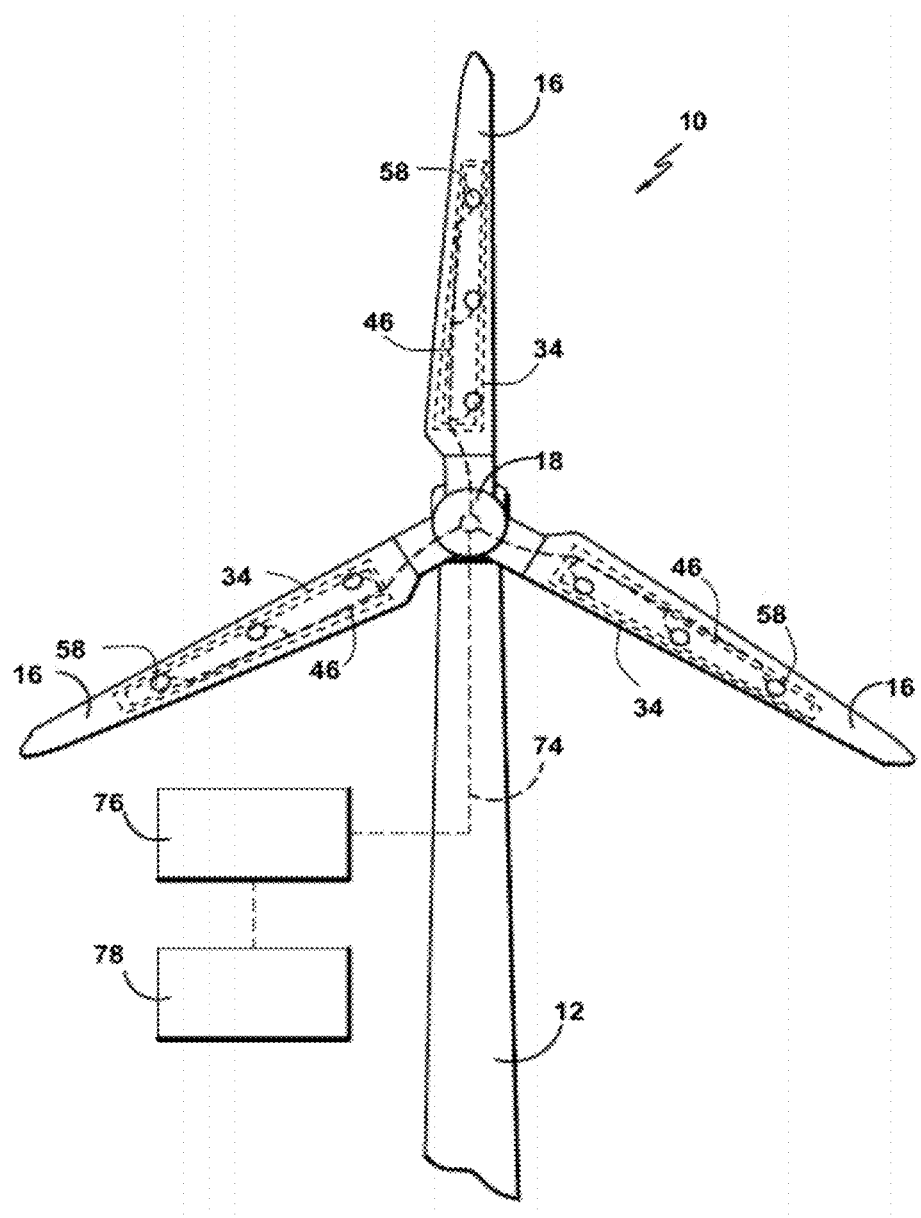
Fig. -14-

WIND TURBINE ROTOR BLADE WITH VARIABLY ACTUATABLE POROUS WINDOW

FIELD OF THE INVENTION

The present subject matter relates generally to wind turbines, and particularly to wind turbine rotor blades having airfoil passages for load control considerations.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines, including increasing the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components, but may also increase the risk of a sudden catastrophic failure of the rotor blades, for example when excess loading causes deflection of a blade resulting in a tower strike.

Load control is thus a crucial consideration in operation of modern wind turbines. Active pitch control systems are widely used to control the load on the rotor blades by varying the pitch of the blades. However, in high wind conditions, it is often difficult to adjust the pitch angle of the blades due to increased wind resistance and the response rate of the pitch control system.

It is also known to vary the aerodynamic characteristics of the individual rotor blades as a means of load control, for example with controllable vortex elements ("generators"), flaps, tabs, and the like configured on the blade surfaces.

U.S. Pat. No. 6,984,110 describes a system wherein the windmill blades are provided with wind pressure adjusting holes that are variably covered by adjustable plates configured on a side of the blade so as to slide within guides along the surface of the blade. A relatively complex mechanical actuating and control system is required to simultaneously adjust all of the plates on a single blade.

U.S. Pat. No. 7,400,057 describes an omni-directional vertically oriented wind turbine with toroid stacked blades. The blades include air bleed channels along the leading edge and concave surface of each toroid for the purpose of introducing high kinetic energy from the leading edge to the convex surface of the blade to reinforce the boundary layer and reduce airflow separation along the blade. These channels are open (uncovered) and play no meaningful role in load control on the blades.

Accordingly, the industry would benefit from a load control system and method for individual rotor blades that does not adversely affect the aerodynamic performance of the blade within design load constraints and is relatively easy to actuate under high load conditions.

BRIEF DESCRIPTION OF THE INVENTION

Aspects and advantages of the invention will be set forth in part in the following description, or may be obvious from the description, or may be learned through practice of the invention.

In one aspect, a wind turbine rotor blade is provided with a pressure side and a suction side that are joined at a leading edge and trailing edge. A porous window is defined in the suction side as a section having at least one opening or hole defined therein. In a particular embodiment, a plurality of holes are defined in the porous window. An air manifold is disposed within an internal cavity of the blade and is in airflow communication with the porous window. For example, in one embodiment, the porous window may be disposed over the air manifold. An inlet air passage is provided in the pressure side and is in communication with the air manifold. A deployable cover member is operationally configured adjacent to the porous window and is variably positionable from a fully closed position wherein the cover member blocks airflow through the opening or holes within the porous window to a fully open position wherein airflow is established from the air manifold through the opening or holes in the porous window.

The porous window may have various configurations. For example, the porous window may extend longitudinally along the suction side, with the cover member being deployable chord-wise relative to the blade. In this embodiment, the cover member may be movable in a single direction towards the fully open position, or may be alternately movable towards the trailing edge and the leading edge from the fully closed position so that an option exists for initially uncovering holes adjacent to the trailing edge or adjacent to the leading edge. Multiple cover members may be utilized such that a space between the cover members defines the open portion of the porous window, with the space being movable chord-wise with coordinated movement of the respective cover members.

In another embodiment, a plurality of the deployable cover members may be provided, with each cover member having its own respective porous window defined by the surface coverage area of the cover member. The plurality of porous windows may be aligned longitudinally along the blade. The respective cover members may be separately controllable so as to vary hole coverage between the different porous windows. In this embodiment, the air manifold may be segmented between the different porous windows, or the porous windows may be supplied from a common air manifold.

In still a further embodiment, the porous window extends longitudinally along the suction side and the cover member is deployable longitudinally relative to the blade. For example, the cover member may include passages therein that align with one or more of the opening or holes in the porous window with an incremental longitudinal shift of the cover member. Still further, the passages may have a decreasing longitudinal aspect in a direction of longitudinal movement of the cover member such that holes are uncovered sequentially (in a longitudinal aspect) with a given number of incremental shifts of the cover member.

The cover member may be variously configured relative to the suction side surface. In one embodiment, the cover member may be operatively configured within the internal cavity of the blade and deployable against an inner surface of the porous window, for example along guide structure (e.g., tracks) within the internal cavity. In an alternate embodiment, the cover member is deployable against an outer surface of the porous window. For example, the porous window may be recessed within the suction side, with the cover member deployable between the fully closed and fully open positions within the recess. Still further, the cover member may be deployable from the fully closed position to the fully open position through a slot in the recess and into the internal cavity of the blade.

The form of the cover member and respective actuating mechanism may vary widely within the scope and spirit of the invention. For example, the cover member may be a flexible, semi-rigid member that slides along the inner or outer surface of the porous window between the fully closed and fully open positions. In other embodiments, the cover member may be a retractable pliable member that is pulled across the porous window to the fully closed position. The actuating mechanism that deploys the cover member may be an active device that operates in response to a control signal, or may be a passive device that reacts to a sensed condition, such as load on the wind turbine blade, distance to the tower, or any other sensed condition of the blade.

Any number and configuration of inlet air passages may be in communication with the air manifold. In a still further embodiment, the inlet air passages may include an actuatable cover plate that moves from a closed position wherein the inlet air passage is blocked, to an open position wherein the inlet air passage is unblocked to allow airflow into the manifold and out through the porous window. Control of this cover plate would be coordinated with movement of the cover member.

The invention also encompasses a wind turbine having one or more turbine blades configured with the active or passively actuated airfoil passages as described herein.

The invention also encompasses various method embodiments for controlling load on a wind turbine blade by variably positioning a cover member relative to a porous window defined in the suction side of the blade between a fully open position and a fully closed position, wherein in an open position of the cover member, airflow is established from a pressure side of the blade, through the blade, and out through the porous window.

In a particular method embodiment, the cover member is deployed chord-wise relative to the blade, and may be movable towards either the leading edge or trailing edge of the blade. In an alternate embodiment, the cover member is moved longitudinally relative to the blade, and may move in either longitudinal direction.

Other method embodiments may include deploying the cover member within an internal cavity of the blade, while other embodiments deploy the cover member externally of the blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a longitudinal view of a wind turbine rotor blade with a plurality of porous windows and associated cover members aligned longitudinally along the blade;

FIG. 3 illustrates a longitudinal view of a wind turbine rotor blade with a longitudinally deployable cover member;

FIG. 4 illustrates a longitudinal view of a wind turbine rotor blade with a chord-wise deployable cover member within a recess in the outer surface of the blade;

FIG. 5 illustrates a longitudinal view of a wind turbine rotor blade with an alternative embodiment of a longitudinally deployable cover member;

FIG. 6 illustrates a longitudinal view of a wind turbine rotor blade with yet another embodiment of a longitudinally deployable cover member;

FIG. 7 is a longitudinal view of an embodiment of a wind turbine blade with dual deployable cover members;

FIG. 8 is a cross-sectional view of an embodiment of an internal chord-wise deployable cover member;

FIG. 9 is a cross-sectional view of another embodiment of an internal chord-wise deployable and retractable cover member;

FIG. 10 is a cross-sectional view of yet another embodiment of an internal chord-wise deployable and retractable cover member;

FIG. 11 is a cross-sectional view of an embodiment of an external chord-wise deployable cover member;

FIG. 12 is a longitudinal internal view of a wind turbine blade illustrating an embodiment of an air manifold with a plurality of inlet air passages;

FIG. 13 is a cross-sectional view of an embodiment of an internal continuous loop cover member; and, FIG. 14 is an illustration of a wind turbine with rotor blades in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12, a nacelle 14 mounted on the tower 12, and a rotor hub 18 that is coupled to a generator within the nacelle 14 through a drive shaft and gearing. The tower 12 may be fabricated from tubular steel or other suitable material. The rotor hub 18 includes one or more rotor blades 16 coupled to and extending radially outward from the hub 18.

The rotor blades 16 may generally have any suitable length that enables the wind turbine 10 to function according to design criteria. For example, the rotor blades 16 may have a length ranging from about 15 meters (m) to about 91 m. However, other non-limiting examples of blade lengths may include 10 m or less, 20 m, 37 m, or a length that is greater than 91 m. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

As shown in the illustrated embodiment, the wind turbine 10 may also include a turbine control system or turbine controller 76 (FIGS. 1 and 14) located within the nacelle 14 or at any location on or in the wind turbine 10, or generally at any other suitable location. The controller 76 may include suitable processors and/or other processing functionality configured to perform the methods, steps, operations, calculations and the like described herein. For example, in one embodiment, the controller 76 may be configured as a computer or other central processing unit. Further, the controller 76 may also include various input/output channels and/or devices for receiving inputs from sensors and other measurement devices and for sending control signals to various components of the wind turbine, particularly to the deployable cover members 46 as described herein.

By executing wind turbine control commands, the controller 76 may generally be configured to control the various operating modes of the wind turbine 10 (e.g., start-up or shut-down sequences). The controller 76 may also be configured to control the blade pitch or pitch angle of each of the rotor blades 16 to control the load and power generated by the wind turbine 10. For instance, the controller 76 may control the pitch angle of the rotor blades 16, either individually or simultaneously, by transmitting suitable control signals to a pitch drive or pitch adjustment system within the nacelle 14. Further, as the direction of the wind changes, the controller 76 may be configured to control the position of the nacelle 14 relative to a yaw axis via a yaw drive mechanism within the nacelle 14 to position the rotor blades 16 with respect to the wind direction.

During operation of the wind turbine 10, wind strikes the rotor blades 16, which causes the rotor hub 18 to rotate. As the rotor blades 16 are rotated and subjected to centrifugal forces, the blades are also subjected to various loading forces and bending moments. As aerodynamic loads increase, excessive forces and bending moments can cause one or more of the rotor blades 16 to strike the tower 12 resulting in significant damage and downtime. However, even without a tower strike, excessive loading and bending moments can cause significant fatigue on the rotor blades 16 and other wind turbine components.

FIGS. 2 through 7 represent longitudinal views of various embodiments of wind turbine rotor blades 16 in accordance with varying aspects of the invention. FIGS. 8 through 11 and 13 shown cross-sectional views of various embodiments of the blades 16. The blades 16 include a suction side 20 and a pressure side 22. The sides 20, 22 are joined at a leading edge 24 and a trailing edge 26 from a blade tip 30 to a root 28. An internal cavity 32 is defined within the blade 16 wherein any manner of structure, control devices, and the like may be located. For example, although not illustrated in the figures, the rotor blade 16 would typically incorporate structural support members such as a longitudinally extending web and respective spar caps attached to the inner surfaces of the suction side 20 and pressure side 22. It should also be appreciated that the rotor blades 16 are not limited to any particular shape or configuration, and that the blades illustrated in the present figures are not meant as a limitation on the overall design and configuration of the blades.

Still referring to FIGS. 2 through 7, the blade 16 includes at least one porous window 34 defined in the suction side 20 of the blade 16. The porous window 34 may be variously configured. For example, the porous window may be a section of the suction side 20 having a plurality of holes defined therein, or a relatively large single opening or hole. The porous window 34 may include a screen or mesh-type of material, as depicted in FIG. 3. It should be appreciated that the porous window 34 encompasses any configuration wherein a defined section of the suction side 20 is permeable to airflow through the respective section. In the embodiment of FIG. 2, the porous window 34 includes a plurality of holes 40 that extend through the suction side 20 and into the internal cavity 32 of the blade 16. It should be appreciated, however, that the porous window 34 may have a single large opening, or a plurality of openings having varying shape, size, and so forth. The location and orientation of the porous window 34, as well as the number, shape, and configuration of holes 40, can vary widely within the scope and spirit of the invention depending on any number of factors, such as blade configuration and aerodynamic profile, length and location along the longitudinal axis of the blade or chord axis 50 (FIG. 8), the loading conditions experienced by the blade 16, and so forth. In the particular embodiment depicted in FIG. 2, a plurality of separate porous windows 34 are spaced longitudinally along the blade 16. As described in greater detail below, the extent of the porous windows 34 is defined essentially by the dimensions (i.e., coverage) of an associated cover member 46.

With respect to the orientation of the porous windows 34 or movement of a respective cover member 46 (described in greater detail below), the terms "longitudinal" and "chord-wise" encompass any direction having a longitudinal aspect or a chord-wise aspect, respectively. For example, a porous window 34 that is oriented diagonally (or a cover member 46 that moves diagonally) with respect to the blade chord has both a chord-wise orientation and a longitudinal orientation.

The blade 16 includes an air manifold 42 (FIG. 8) within the internal cavity 32. The air manifold 42 is in airflow communication with the respective porous window 34. At least one inlet air passage 44 defined in the pressure side 22 of the blade 16 is in communication with the air manifold 42, as depicted in FIGS. 8 and 9. The air inlet passage 44 and air manifold 42 define an airflow conduit for air through the blade 16, and particularly through the holes 40 in the porous window 34, as a function of the position of a deployable cover member 46. The cover member 46 is configured adjacent to the porous window 34 and is variably positionable from a fully closed position wherein airflow through the porous window 34 is blocked, to a fully open position wherein airflow is established through the entirety of the porous window 34.

In the embodiment depicted in FIG. 2, a plurality of respective porous windows 34 are defined longitudinally along the blade 16, with each of the porous windows 34 having an associated deployable cover member 46. Each of the cover members 46 is deployable in a chord-wise direction (between the leading edge 24 and trailing edge 26, as depicted by the arrows 48 in FIG. 2. The cover members 46 may be movable along any manner of guide structure 54 provided within or external to the internal cavity 32 of the blade 16 and adjacent to the suction side 20 of the blade. The porous window 34 closest to the blade root 28 has the cover member 46 in the fully closed position wherein all of the holes 40 are "covered" by the underlying cover member 46 so that airflow from the manifold 42 cannot pass through this particular porous window 34. The remaining porous windows 34 all have some portion of their respective holes 40 uncovered such that an airflow passage is established through the blade 16 via the inlet air passage 44, air manifold 42, and holes 40. As described in greater detail below, any manner of suitable actuating mechanism is configured with the cover members 44 to move the cover members in at least one chord-wise direction between the fully closed position and the fully opened position. In the embodiment depicted in FIG. 2, the arrows 48 are meant to indicate that the respective cover members 46 may be moved in a direction towards the leading edge 24 or towards the trailing edge 26 depending on whether leading or trailing holes 40 are intended to be initially uncovered when moving the cover member 46 from the fully closed position towards the fully opened position.

As depicted in FIG. 4, a single porous window 34 may be disposed longitudinally along the suction side 20 of the blade 16, instead of the plurality of separate porous windows 34 as depicted in FIG. 2. In the embodiment of FIG. 4, a single deployable cover member 46 is associated with the porous window 34 and is movable in either chord-wise direction (arrow 48) relative to the leading edge 24 and trailing edge 26 of the blade. In addition, FIG. 4 illustrates the deployable cover member 46 as being operational on the outer surface of the suction side 20, as compared to the configuration in FIG. 2 wherein each of the deployable cover members 46 are operational within the internal cavity 32 of the blade against an inner surface of the suction side 20. A recess 56 may be defined in the external aspect of the suction side 20 in which the porous window 34 is defined, with the cover member 46 being movable within the recess 56. Desirably, when the cover member 46 is in the fully closed position, the cover member 46 essentially "fills" the recess 56 so as to provide a more aerodynamic profile to the blade 16.

It should be appreciated from a comparison of the embodiments of FIG. 2 and FIG. 4 that the separately defined porous windows 34 and separately controlled cover members 46 of the embodiment of FIG. 2 offer a greater degree of variability in controlling the profile of opened holes 40 along the longitudinal length of the blade 16. For example, it may be that under certain operating conditions, the section of the blade 16 adjacent to the root 28 experiences a greater load than the section of the blade adjacent to the tip 30, or vice versa. In such varying load conditions, it may be desirable to specifically tailor a load reduction profile for the blade 16 by varying the relative positions of the individual respective cover members 46 within their respective porous window 34, as depicted in FIG. 2. In the embodiment of FIG. 4, the entire longitudinal profile of the porous window 34 is uniformly controlled with movement of the cover member 46 in the chord-wise direction.

FIG. 3 illustrates an embodiment of the blade 16 wherein the porous window 34 is again defined by a screen or mesh insert disposed longitudinally along the suction side 20 of the blade 16. In this embodiment, however, the cover member 46 is deployable in the longitudinal direction of the blade 16, as indicated by the directional arrow 48. The window 46 in this particular embodiment is movable along guide structure within the internal cavity 32 of the blade 16 from a fully closed position wherein all of the porous window 34 is completely covered towards either the root portion 28 or the tip portion 30 of the blade, depending on which portion of the porous window 34 is to be initially opened. For example, if the control system indicates that load on the blade 16 dictates that holes closer to the root 28 should be initially opened, then the deployable cover member 46 is moved to the tip 30 of the blade, as depicted in FIG. 3. Alternatively, the deployable cover 46 may be moved from the fully closed position towards the root 28 so as to open the portion of the porous window 34 closer to the tip 30 of the blade, again depending on a particular load profile experienced by the blade 16.

FIG. 5 depicts an alternative embodiment of the blade 16 wherein the deployable cover member 46 is again movable in a longitudinal direction relative to the root 28 and tip 30. In this particular embodiment, the porous window 34 includes spaced apart holes 40. The cover member 46 includes passages 52 that, in a fully closed position of the cover member 46, are offset from the holes 40, as depicted in FIG. 5. The cover member 46 may be incremented in the longitudinal direction towards to the root 28 (as indicated by the arrow 48 in FIG. 5) to a fully opened position wherein the passages 52 align with the holes 40. It should be appreciated that the cover member 46 may be incrementally shifted between the fully closed position illustrated in FIG. 5 to the fully opened position so that a variable degree of hole opening is achieved. For example, a first incremental shift of the cover member 46 may only open 10% of the surface area of the holes 40, and so forth. In this embodiment, the cover member 46 may be movable within guide structure 54 configured with the internal cavity 32 of the blade 16 so that the cover member 46 moves against the inner surface of the suction side 20.

It should be readily appreciated that the various configurations of deployable cover members 46 described herein may be alternately configured so as to be deployable on either of the outer or inner surfaces of the suction side 20. For example, the configurations of FIGS. 3 and 5 may be alternately configured so that the deployable cover members 46 move within a recess or other guide structure defined on the outer surface of the suction side 20.

FIG. 6 illustrates yet another embodiment of a blade 16 wherein the cover member 46 is deployable in the longitudinal direction between the tip 30 and root 28 of the blade. In this particular embodiment, the holes 40 are equally spaced along the porous window 34 and the passages 52 within the deployable cover member 46 have a decreasing longitudinal open aspect from one end of the cover member 46 to the other. With this configuration, longitudinal movement of the cover member 46 from the fully closed position illustrated in FIG. 6 to the fully open position produces a sequential uncovering of the holes 40. For example, in the embodiment of FIG. 6, a first incremental shift of the cover member 46 to the right (indicated by the arrow) results in the left-hand most hole 40 within the porous window 34 being uncovered. A subsequent sequential shift of the cover member 46 in the same direction results in the adjacent hole 40 being uncovered. Similarly, another sequential shift of the cover member 46 results in the next hole 40 being uncovered, and so forth. It should be readily appreciated that the decreasing longitudinal open aspect of the passages 52 may be reversed from the configuration illustrated in FIG. 6 so that the sequential order of opening of the holes 40 is reversed from that depicted in FIG. 6. In this embodiment, the cover member 46 is slidable within a recess 56 defined in the outer surface of the suction side 20.

FIG. 7 is an embodiment wherein dual deployable cover members 46 define an open area 49 therebetween having a defined width. This open area 49 may be moved chord-wise relative to the suction side 20 by coordinated movement of the cover members 46. The chord-wise width of the open area 49 may be adjusted by movement of either or both of the cover members towards or away from each other.

FIGS. 8 through 11 illustrate various embodiments of internal structure associated with the deployable cover members 46, inlet air passages 44, and air manifold 42, in different unique embodiments. Referring to FIG. 8, the cover member 46 in this particular embodiment may be a flexible, semi-rigid member, such as a flexible composite material that is able to conform to the dimensions and variations of the suction side 20 of the blade in the chord-wise and longitudinal direction.

The cover member 46 in this embodiment slides along the inner surface of the suction side 20 between a fully closed position wherein the cover member 46 underlies (and thus blocks) all of the holes 40 (or other type of passages) in the porous window 34. As indicated by the arrow 48 in FIG. 8, in this particular embodiment, the cover member 46 is deployable in the chord-wise aspect in both directions by any manner of suitable actuating mechanism 58 that is controlled by a respective controller 60. For example, the actuating mechanism 58 may be a friction roller that is rotatable in either direction so as to engage and move the cover member 46 in either chord-wise direction along any manner of suitable guide or track structure within the internal cavity 32 of the blade 16. In an alternative embodiment, the actuating mechanism 58 may be a gear that engages a pinion or gear track defined on the underside of the cover member 46 so as to drive the cover member 46 in both directions. Alternatively, different respective drives may be provided, with each drive configured to move the cover member 46 in one direction while the other drive is in idle state.

It should be readily appreciated that the present invention is not limited to any particular type of actuating mechanism 58 that may be utilized to move the cover members 46 as described herein.

The deployable cover members 46 may be actuated by any manner of suitable control mechanism 60. A respective control mechanism 60 may be associated with each cover 46 in embodiments having a plurality of porous windows 34 and respective cover members 46 (as in the embodiment of FIG. 2) so that the cover members 46 are independently actuated. Alternatively, the set of cover members 46 may be controlled in unison from a single controller 60. The control mechanisms 60 may be configured to variably open the cover member 46 between the fully closed and fully opened position so that the volumetric flow rate of air through the respective porous window 34 can be variably controlled as a function of varying load conditions experienced by the blade.

In particular embodiments, the actuating mechanism 58 is an "active" mechanism that responds to a control signal from the controller 60. For example, the active actuating mechanism 58 may incorporate an electric motor that is powered by any suitable power supply. The motor may rotate in opposite directions to open and close the cover member 46 (as discussed above) in response to a signal received from the controller 60. The controller 60 may, in turn, receive a control signal from the wind turbine controller 76 as a result of any manner of sensed or computed load condition on the blade 16.

In alternate embodiments, the actuating mechanism 58 may be a passive device that responds to actual load conditions experienced by the blade 16. For example, the cover member 46 may be latched in a fully closed position and biased towards the opened position by any manner of biasing element, such as a torsion spring, leaf spring, and so forth. Upon a particular condition experienced by the blade, the latch may release the cover member 46 such that the cover member 46 is automatically drawn to (or towards) the opened position. This sensed condition may be, for example, distance of the blade relative to the tower 12. The latch may be a magnetic device that is caused to unlatch when the blade passes within a predefined distance from the tower 12. In alternative embodiments, a passive actuating mechanism 58 may be configured to be responsive to load conditions sensed by the blade, for example by sensing deflection of the blade, and the like.

FIG. 9 depicts an embodiment wherein the deployable cover member 46 is formed form a pliable material that can be rolled around a core 62. The core 62 may be spring driven so as to pull the cover member 46 towards the fully opened position. The cover member 46 is attached to a driven roller 64 by any suitable configuration of attachment devices 65, such as chords, ribbons, and the like, that are sufficiently spaced apart so as to evenly pull the cover member 46 towards the closed position without excessively blocking the holes 40 in the open position of the cover member 46. The lines 65 may, in this regard, be spaced between the holes 40. In an alternate embodiment, the attachment device 65 may be a porous web or other porous material that is coextensive with the cover member 46. With this embodiment, in the open position of the cover member 46, air flows through the porous attachment device 65 and porous window 34.

FIG. 10 depicts an alternate embodiment wherein the cover member 46 is a semi-pliable member that may be creased so as to fold into a compacted configuration within a storage locker 66. Again, the end of the cover member 46 is attached to a driven roller 64 by any manner of suitable attachment lines 65, whereby the roller 64 pulls the cover member 46 from the locker 66 to the fully closed position. Any manner of retraction device may be configured within the storage locker 62 to pull the cover member 46 back into the folded configuration within the locker 66.

FIG. 11 depicts an embodiment of the blade 16 wherein the cover member 46 is deployable within a recess 56 defined in the outer surface of the suction side 20, as discussed in the various embodiments above. In this particular embodiment, the cover member is external to the porous window 34 in the fully closed position within the recess 56. The cover member 46 is moved to the opened position through a slot 57 defined in the recess 56 such that the cover member 46 moves into the internal cavity 32 of the blade as it is deployed towards the fully opened position by any manner of suitable actuating mechanism 58. This particular configuration may be desired in that the recess 56 defined in the outer surface of the suction side 20 need not be sized so as to accommodate the cover member 46 in the fully closed and fully opened positions. This may provide a more aerodynamic aspect to the blade 16.

FIG. 13 depicts an embodiment wherein the cover member 46 is a continuous loop member driven by at least one rotatably driven roller 63 controlled by controller 60. The cover member 46 runs around any number and configuration of idler rollers 64, and may also be deployed over any suitable type of tensioning device, such as a tensioning roller, spring arm, or the like. The cover member 46 is comprised of non-permeable sections 45 and permeable sections 47. In the position of the cover member 46 depicted in FIG. 13, the permeable sections 47 are aligned with the porous window 34 in the suction side 20 and the inlet air passage 44 in the pressure side 22 such that air flows completely through the manifold 42 defined by walls 43. The cover member 46 is depicted in a fully open position in the figure. Movement of the looped cover member 46 in either direction (arrow 48) changes the surface area amount of the permeable section 47 that is aligned with the porous window 34 and, thus, defines the degree of porosity of the porous window 34. The window 34 is closed by rotation of the cover member 46 to a position wherein the non-permeable section 45 completely blocks the porous window 34. It may also be desired that the bottom non-permeable section 45 also completely block the air passage 44 in the pressure side 22. In this regard, closing and opening of the air passage 44 is coordinated with the relative degree of opening and closing of the porous window 34. The bi-directional movement of the cover member 46 also allows for variable positioning of the permeable section 47 towards the leading edge or trailing edge of the blade.

It should be appreciated that any manner and configuration of inlet air passages 44 may be configured with the air manifold 42 for any given respective porous window 34. FIG. 12 illustrates an embodiment of an air manifold 42 that is disposed longitudinally along the blade 16. This particular manifold 42 may be used with a plurality of independently actuatable cover members 46 and respective porous windows 34, such as in the embodiment of FIG. 2. Any manner of divider wall 72 is provided to partition off the manifold 42 with respect to the porous windows 34, with each partitioned section having a respective air inlet passage 44. The portion of the manifold 42 closest to the root 28 has multiple inlet passages 44. Any number of the passages 44 may be configured with any one of the sections of the manifold 42. The partitioned manifold 42 depicted in FIG. 12 may be desired due to the varying pressure conditions experienced along the longitudinal length of the blade. For example, the differential pressure between the pressure and suction side of the blade at the root 28 will vary substantially from the differential pressure between the respective sides experienced at the tip 30 of the blade.

It should, however, also be appreciated that a single-common air manifold 42 may be configured for a plurality of individual porous windows 34 and respective deployable covers 46, with this common air manifold 42 having any number and configuration of air inlet passages 44.

In particular embodiments, it may be desired to provide each of the inlet air passages 44 with an actuatable cover plate 68 that moves from a closed position (FIG. 8) wherein the inlet air passage 44 is blocked, to an opened position (FIG. 9) wherein the air inlet passage 44 is unblocked to allow airflow into the manifold 42 and out through the porous window 34. Any manner of suitable actuator 70 may be provided for moving the cover plate 68 between the closed and opened positions. In the embodiment of FIG. 8, the actuator 70 is depicted with an arm that extends through a wall of the manifold 42. It should be appreciated that movement of this arm would be sealed relative to the manifold 42. The actuator 70 may be an active device that is also controlled by the controller 60 to move the cover plate 68 in response to a control signal. In particular embodiments, any one of the active actuating mechanisms 58 configured with the deployable cover member 46 and the actuator 70 configured with the cover plate 68 may be controlled in unison from the controller 60 so that the airflow passage through the blade 16 is simultaneously established at the suction side 20 and pressure side 22 of the blade.

FIG. 14 depicts a wind turbine 10 wherein each of the rotor blades 16 incorporates one or more of the porous windows 34 and associated cover members moved by any suitable configuration of actuating mechanisms 58. Control and/or power lines 74 are provided for a coordinated control of the various cover members 46 via the wind turbine controller 76. The controller 76 may, in turn, receive any manner of input from various sensors 78 that are appropriately disposed and configured to sense various operating conditions on the blades 16, such as extreme or transient load conditions experienced by the blades 16. At such load conditions, the controller 76, via the power/control lines 74, can actuate any number or combination of the cover members 46. In order to maintain the overall balance of the rotor 18 and blades 16, the same number and combination of cover members 46 on each of the blades 16 may be actuated in unison via their respective control mechanisms 60. At the end of the transient load condition, the cover members 46 may be returned to their closed position.

It should be appreciated that the actuatable airfoil passages or wind turbine rotor blades as described herein offer unique advantages. Extreme load conditions often are the design limiting considerations with the result that a relatively few number of load conditions require the wind turbine to have a greater overall system cost for a design load capability. If the extreme load cases were reduced, then the overall system cost of the wind turbine can be correspondingly reduced. The actuatable porous windows and associated cover members as described herein provide a relatively cost efficient means for minimizing the impact of extreme load conditions by reducing the load variations created by the extreme load conditions, whereby the mean loading can be increased for a given system load capability. For example, longer rotor blades may be used to define a greater rotor sweep area if the actuatable porous windows are used to minimize the extreme load conditions that may be otherwise experienced by the longer rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine blade, comprising:
   a pressure side, and a suction side, said pressure side and said suction side joined at a leading edge and a trailing edge and defining an internal cavity of said blade;
   a porous window defined in said suction side, said porous window permeable to airflow from within said internal cavity through said suction side, said porous window defined by a plurality of individual holes through a defined material section of said suction side;
   an air manifold within said internal cavity, said porous window in airflow communication with said air manifold such that said air manifold is common to said plurality of individual holes in said porous window;
   an inlet air passage in said pressure side in communication with said air manifold; and,
   a deployable cover member configured with said porous window, said cover member impermeable to airflow therethrough and variably positionable from a fully closed position wherein airflow through said porous window is blocked to a fully open position wherein airflow is established through an entirety of said porous window.

2. The wind turbine blade as in claim 1, wherein said cover member is deployable in a chord-wise direction relative to said blade.

3. The wind turbine blade as in claim 2, wherein said cover member is alternately movable towards said trailing edge and said leading edge from said fully closed position.

4. The wind turbine blade as in claim 3, further comprising a plurality of said porous windows and associated said cover members disposed longitudinally along said blade, said cover members separately controllable so as to vary coverage between said porous windows.

5. The wind turbine blade as in claim 1, wherein said cover member is deployable longitudinally relative to said blade.

6. The wind turbine blade as in claim 1, wherein said cover member comprises a retractable pliable member that is pulled across said porous window to said fully closed position.

7. The wind turbine blade as in claim 1, wherein said cover member is externally deployable in a recess within said suction side.

8. The wind turbine blade as in claim 7, wherein said cover member is deployable from said fully closed position to said fully open position through a slot in said recess and into said internal cavity.

9. A wind turbine blade, comprising:
- a pressure side, and a suction side, said pressure side and said suction side joined at a leading edge and a trailing edge and defining an internal cavity of said blade;
- a porous window defined in said suction side, said porous window permeable to airflow from within said internal cavity through said suction side;
- an air manifold within said internal cavity, said porous window in airflow communication with said air manifold;
- an inlet air passage in said pressure side in communication with said air manifold;
- a deployable cover member configured with said porous window, said cover member variably positionable from a fully closed position wherein airflow through said porous window is blocked to a fully open position wherein airflow is established through an entirety of said porous window; and
- wherein said cover member comprises one of a flexible, semi-rigid, or pliable member that slides across said porous window in said suction side between said fully closed and said fully open positions.

10. The wind turbine blade as in claim 9, wherein said cover member comprises passages therein that align with holes in said porous window with an incremental longitudinal shift of said cover member.

11. The wind turbine blade as in claim 10, wherein said passages have a decreasing longitudinal open aspect in a direction of longitudinal movement of said cover member such that holes are uncovered sequentially with a given number of incremental shifts of said cover member.

12. The wind turbine blade as in claim 9, wherein said cover member is alternately deployable towards said trailing edge and said leading edge to uncover portions of said porous window closest to said leading edge and said trailing edge, respectively.

13. A method for controlling load on a wind turbine blade, comprising:
- variably positioning a cover member relative to a porous window defined in the suction side of the blade between a fully open position and a fully closed position;
- wherein the cover member is one of a flexible, semi-rigid, or pliable member that slides across the porous window in the suction side between a fully closed and a fully open position;
- wherein in an open position of the cover member, airflow is established from a pressure side of the blade, through the blade, and out through the porous window.

14. The method as in claim 13, comprising moving the cover member chord-wise relative to the blade.

15. The method as in claim 13, comprising moving the cover member longitudinally relative to the blade.

16. The method as in claim 13, further comprising separately controlling a plurality of cover members with respect to a plurality of different porous windows such that a varying coverage is established between the different porous windows.

17. The method as in claim 13, comprising deploying the cover member within an internal cavity of the blade.

18. The method as in claim 13, comprising deploying the cover member externally of the blade.

* * * * *